United States Patent
Diekmeyer et al.

(10) Patent No.: US 8,529,660 B2
(45) Date of Patent: Sep. 10, 2013

(54) CONTROL DEVICE AND CONTROL METHOD FOR A VEHICLE COMPRESSED AIR PREPARATION DEVICE

(75) Inventors: Heinrich Diekmeyer, Barsinghausen (DE); Kevin Pendzich, Hannover (DE); Joachim Reinhardt, Hannover (DE); Wolfgang Strache, Hemmingen (DE)

(73) Assignee: WABCO GmbH, Hannover (DE)

( * ) Notice: Subject to any disclaimer, the term of this patent is extended or adjusted under 35 U.S.C. 154(b) by 238 days.

(21) Appl. No.: 13/127,545

(22) PCT Filed: Aug. 8, 2009

(86) PCT No.: PCT/EP2009/005778
§ 371 (c)(1),
(2), (4) Date: Jun. 13, 2011

(87) PCT Pub. No.: WO2010/051868
PCT Pub. Date: May 14, 2010

(65) Prior Publication Data
US 2011/0259189 A1    Oct. 27, 2011

(30) Foreign Application Priority Data
Nov. 7, 2008   (DE) .......................... 10 2008 056 322

(51) Int. Cl.
*B60T 17/00*    (2006.01)
*B01D 53/26*    (2006.01)

(52) U.S. Cl.
USPC .... 95/10; 95/11; 96/111; 96/113; 55/DIG. 17

(58) Field of Classification Search
USPC ..................... 96/109, 111, 113, 114; 95/1, 8, 95/10, 11, 19, 21, 117; 55/DIG. 17; 34/80, 34/472, 473
See application file for complete search history.

(56) References Cited

U.S. PATENT DOCUMENTS

| 5,145,495 | A  | * | 9/1992  | Elamin ............................ 96/114 |
| 5,592,754 | A  | * | 1/1997  | Krieder et al. ................... 34/527 |
| 6,640,463 | B1 | * | 11/2003 | Beck et al. ....................... 34/527 |
| 6,682,459 | B1 | * | 1/2004  | Knight ........................... 477/183 |
| 6,824,594 | B2 | * | 11/2004 | Larsson .......................... 96/109 |
| 2005/0258680 | A1 | * | 11/2005 | Blackwood et al. .............. 303/2 |
| 2008/0206070 | A1 |   | 8/2008  | Kley et al. |
| 2009/0232668 | A1 |   | 9/2009  | Sabelstrom et al. |
| 2010/0174451 | A1 |   | 7/2010  | Leinung |

FOREIGN PATENT DOCUMENTS

| DE | 10 2004 059 834 A1 | 6/2006 |
| DE | 10 2004 059 835 A1 | 6/2006 |
| DE | 10 2007 032 963 A1 | 1/2009 |
| DE | 10 2008 006 860 A1 | 8/2009 |
| EP | 1 183 172 B2       | 3/2002 |
| WO | WO 2005/082675 A1  | 9/2005 |
| WO | WO 2006/071170 A1  | 7/2006 |
| WO | WO 2009/010199 A1  | 1/2009 |

* cited by examiner

*Primary Examiner* — Frank Lawrence, Jr.
(74) *Attorney, Agent, or Firm* — Kramer Levin Naftalis & Frankel LLP

(57) ABSTRACT

A control device for a compressed air preparation device of a vehicle outputs output signals for adjusting feed phases and regeneration phases of the compressed air preparation device. A compressor feeds compressed air via an air dryer having a desiccant into a compressed air reservoir in a feed phase, and compressed air is passed out of the compressed air reservoir through the air dryer for drying the desiccant in a regeneration phase. The control device adjusts the regeneration phases depending on a current or future engine load and/or a current or future consumption of compressed air by the vehicle. In overrun phases, the desiccant can be excessively dried to a low moisture level in order to save fuel in later travel segments. Route-optimized regeneration of the desiccant as a function of engine load and/or utilization phases can also be effected.

21 Claims, 2 Drawing Sheets

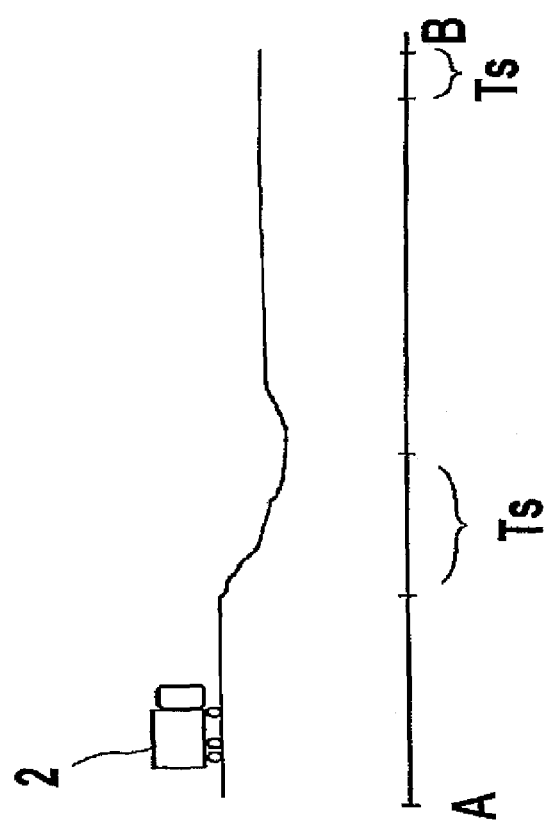

CONTROL DEVICE AND CONTROL METHOD FOR A VEHICLE COMPRESSED AIR PREPARATION DEVICE

FIELD OF THE INVENTION

The invention generally relates to a control device for a compressed air preparation device of a vehicle, a corresponding compressed air preparation device and to a method for controlling the compressed air preparation device.

BACKGROUND OF THE INVENTION

A compressed air preparation device of a vehicle, in particular of a utility vehicle, is generally connected to a compressor that is driven directly by the engine. The compressor can be arranged directly on the engine shaft and therefore can always be driven when the engine is rotating, or can be coupled to the engine via a clutch. In feed phases, the compressor feeds compressed air that first passes through an air dryer, which generally has a dry granulate as the desiccant and can, if appropriate, additionally carry out cleaning. The compressed air that is fed and dried is subsequently stored in a compressed air reservoir and can be output to consumer circuits, which can, for example, be brake control circuits of pneumatic brake systems and/or pneumatic ride level control devices with air bellows. In this context, the individual consumer circuits can also have compressed air reservoirs.

In a feed phase or charging phase, the moisture content of the air dryer is therefore increased; and in order to avoid over-saturation of the desiccant and lower the degree of moisture thereof again, a portion of the dry compressed air that has been stored in the compressed air reservoir is fed back again via the air dryer in regeneration phases, and the compressed air that is therefore permeated with moisture is output, for example, to the surroundings. These regeneration phases generally occur directly subsequent to a feed phase, with the result that a fixed air flow rate or a specific portion of the previously fed air flow rate is always used for the regeneration. The initiation of these regeneration phases can take place in a purely mechanical fashion or else electrically by means of the control device.

The use of the air dryer therefore permits the compressed air system to be protected against damaging moisture, in particular condensation, and, against the moisture freezing, and the corresponding consequent damage.

Since the feed phase is associated with engine fuel consumption, in each case a certain amount of energy or a corresponding portion of the previously input fuel is used in the regeneration phases. Given differing load states, in particular in the case of increased consumption of compressed air and therefore in the case of relatively long feed phases, in each case regeneration phases should be interposed where appropriate, and this is disadvantageous, in particular, in the case of relatively long use phases and feed phases.

EP 1 183 172 B1 describes a compressed air brake system in which, in overrun phases in which the movement energy of the vehicle drives the engine and the connected compressor, the compressed air reservoir is charged beyond the usual setpoint value since this additional feeding of compressed air takes place without additional consumption of fuel. As a result, the feed phases in which the engine drives the compressor while consuming fuel can be shortened to a corresponding degree or avoided, with the result that the overall fuel consumption can be reduced.

SUMMARY OF THE INVENTION

Generally speaking, it is an object of the present invention to provide a compressed air preparation device that can achieve a relatively low fuel consumption and an appropriate compressed air flow rate.

It will be appreciated that, with the present invention, it is therefore possible to carry out a management process of the engine load and/or of the generation of compressed air that includes the regeneration phases.

A management process of the engine load takes into account, in particular, the fuel consumption and can therefore determine phases with relatively low fuel consumption and relatively high fuel consumption (per distance travelled); in phases with a relatively low engine load it is possible for the desiccant to be excessively dried, i.e., to be set to a relatively low setpoint degree of moisture, with the result that no additional loading of the engine for the regeneration is necessary in phases with a relatively high engine load.

In particular, in this management process of the engine load overrun phases, that is phases in which the engine torque generated by the movement energy of the vehicle when the engine is coupled is higher than the engine torque requested by the driver by means of the accelerator pedal, can be used to feed compressed air via the engine and the compressor and to store it in the compressed air reservoir, with the result that some of this additionally fed compressed air can subsequently be used for the regeneration of the desiccant. As a result, the energy available in overrun phases without additional consumption of fuel can be used not only for the additional storage of compressed air but also for excessive drying of the air dryer.

Inventive embodiments are based on the recognition that in an overrun phase a portion of the movement energy of the vehicle can be stored in the form of excessive drying of the desiccant of the air dryer, since otherwise the drying of the desiccant is associated with a certain degree of fuel consumption.

According to embodiments of the present invention, the excessive regeneration can be carried out not only in or after an overrun phase but also before the overrun phase if the phase is known in advance. In this way, it is possible, where appropriate, for the compressed air reservoir to be emptied to below the otherwise relevant setpoint pressure (for example to above a minimum reserve value) by an additional regeneration phase, since cost-effective charging is subsequently possible in the overrun phase.

Through the targeted planning of the generation of compressed air, route sections of the route with a relatively high compressed air consumption value can be determined in advance. Also, excessive regeneration and, if appropriate, charging of the compressed air reservoir to a relatively high setpoint pressure can be carried out in advance in order to subsequently permit relatively long feed phases and use phases.

With the present invention, it is possible to carry out adjustment to a setpoint degree of moisture, wherein the setpoint degree of moisture is determined by the control device, and an actual value and/or current value is either determined directly by means of a measurement signal of a moisture sensor or is determined indirectly or estimated from the time periods of the last feed phases and regeneration phases. With such adjustment it is therefore possible for the control device to define the setpoint degrees of moisture as a function of the current or future values of the engine load or of the consumption of compressed air.

The invention therefore makes it possible to save fuel. Furthermore, relatively long feed phases or even use phases that persist for a relatively long time and a relatively high air consumption with relatively few or short regeneration phases are possible. As a result, the regeneration phases can be delayed or shortened. This leads, inter alia, to a quieter control behavior and to fewer gear shifting processes, in particular relatively long feed phases are also made possible. Furthermore, the components can, if appropriate, have smaller dimensions.

The route sections with differing compressed air consumption and/or differing engine load can already be determined in advance. This can be done, on the one hand, on the basis of map data or route data relating to the route in advance as well as position data, wherein the position data can be formed, for example, by means of a global position determining system (GPS) and/or a route counter (kilometer counter) of the vehicle. In this way, route profiles or route-dependent feed profiles and/or route-dependent consumption profiles of the compressed air are produced. The profiles can also be determined adaptively or on a self-learning basis, as an addition to or an alternative to the determination on the basis of map data, when the vehicle travels through the respective route repeatedly, for example in the case of a scheduled bus or a truck used on a shuttle basis between two fixed points. In principle, adaptive systems can be formed not only for identical routes but also for similar routes, for which purpose the route profiles that are determined can be compared with one another and evaluated qualitatively.

The route profiles can be assigned not only to the respective route but also on an additional basis to time data, in particular times of day, in order to define the differing traffic load at the various times of day, in particular in the morning, at midday, in the afternoon, in the evening and at night. In addition, it is also possible, for example, to define days of the week. Furthermore, the route profiles that are determined can be continuously updated by corresponding formation of mean values in order also to take into account temporary changes as a result, for example, of road work, obstructions, etc.

With the invention, a vehicle energy management system that can flexibly optimize the energy consumption on a respectively up-to-date basis can therefore be formed.

The control device according to embodiments of the invention implements switching over to a regeneration phase or lengthening of an existing regeneration phase by outputting corresponding control signals, in particular to the valve devices for the setting of the respective phases. The method according to embodiments of the present invention corresponds to the application of the control device.

One advantage of the present invention is that future previously known vehicle states can be approached with increased air consumption, for example unhitching of semi-trailers, shunting, stopping points with already over-regenerated desiccants, with the result that these situations are not impeded or delayed by the regeneration of the desiccant. As a result, the compressed air supply is improved and therefore the maneuvering time of the vehicle reduced and/or the vehicle manufacturer can equip the vehicle with smaller pressure reservoirs and therefore save in terms of cost and space on the vehicle frame.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

The invention will be explained below using a number of exemplary embodiments and with reference to the appended drawings, in which:

FIG. 2 illustrates a vehicle on a route.

DETAILED DESCRIPTION OF THE PREFERRED EMBODIMENTS

Figure 1:
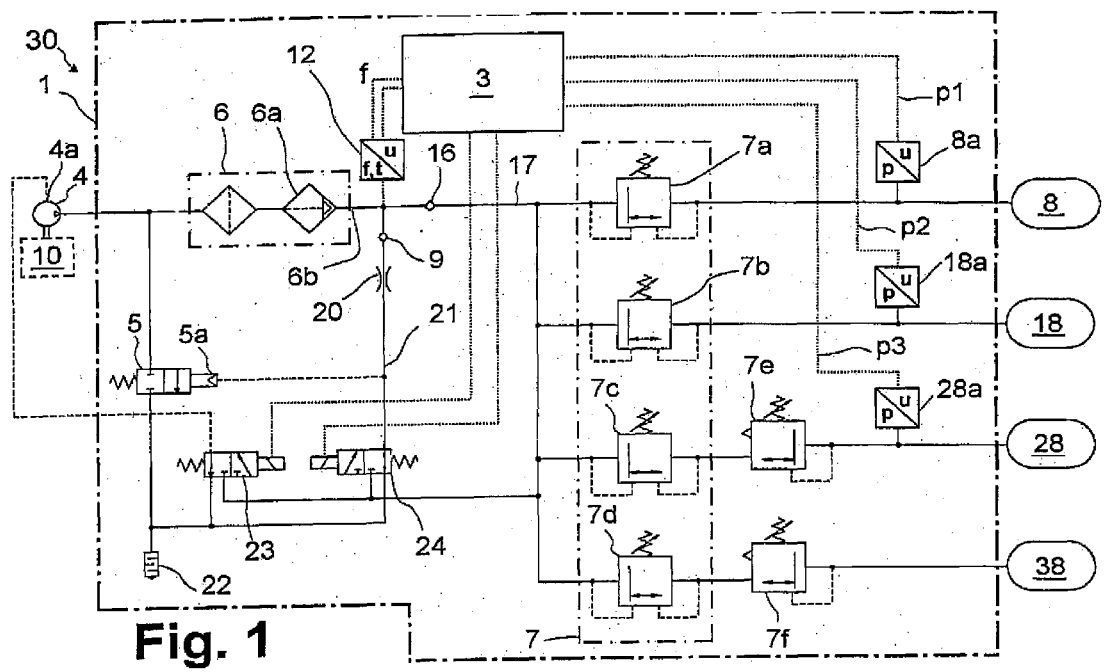
FIG. 1 is a block diagram of an air preparation system according to an exemplary embodiment of the present invention.

A compressed air preparation device 1 of a utility vehicle 2 with a vehicle engine 10 and pneumatic brakes and air springs has, according to FIG. 1, an electronic control device 3 that directly or indirectly controls the operating state of a compressor 4 driven by the engine 10. The compressor 4 can be arranged, for example, directly on the engine shaft and be driven directly by the vehicle engine 10, or can be driven from the vehicle engine 10 via a clutch. It is therefore possible, for example, to set coupling and decoupling of the compressor 4 to and from the engine 10, or in the case of rigid coupling of the compressor 4 to the engine 10, to set a degree of idling when compressed air is not fed.

An air dryer 6, in which a desiccant 6a, for example a drying granulate, is accommodated, is connected to the outlet of the compressor 4. A compressed air feed path 17 with a four-circuit protection valve 7 is connected to the outlet 6b of the air dryer 6 via a non-return valve 16. The four-circuit protection valve 7 has, for example, four overflow valves 7a, 7b, 7c, 7d and, in turn, compressed air reservoirs 8, 18, 28, 38 of the four consumer circuits connected thereto; for example the container 8 is provided for a service brake circuit I, the container 18 is provided for a service brake circuit II, the container 28 for a trailer brake circuit and/or a parking brake circuit, and the container 38 is provided for a secondary consumer circuit. In each case a pressure limiting valve 7e and 7f can be advantageously provided upstream of the containers 28 and 38. Pressure sensors 8a, 18a, 28a, which output signals p1, p2, p3 to the control device 3, are provided in the containers 8, 18, 28 or on the compressed air feed line to these containers.

Furthermore, a non-return valve 9 is connected to the outlet 6b of the air dryer 6 in the closing direction, and an orifice 20 adjoined by a regeneration path 21, which is therefore closed when the compressor 10 is operating. A venting valve 5, which is configured as a 2/2-way valve, is connected between the outlet of the compressor 4 and a sound damper 22, which serves as compressed air outlet; the 2/2-way valve has a pneumatic control inlet 5a that is connected to the regeneration path 21 and switches over from the closed position shown to the open position when pressure is applied.

Furthermore, a compressor control solenoid valve 23 embodied as a 3/2-way valve is connected between a pneumatic control inlet 4a of the compressor 4 and the sound damper 22. In its shown position of rest, the control inlet 4a is therefore pressureless; when the compressor control solenoid valve 23 is actuated by means of the control device 3, it connects the feed path 17 to the control inlet 4a, with the result that the compressor 4 is switched off. A regeneration control solenoid valve 24 is likewise embodied as a 3/2-way valve and is connected between the regeneration path 21 and the sound damper 22. In its non-energized basic state, the regeneration control solenoid valve 24 therefore connects the regeneration path 21 to the sound damper 22, with the result that the regeneration path 21 is pressureless, and when its control inlet is energized by the control device 3 it switches over and connects the regeneration path 21 to the feed path 17.

In one embodiment of a compressed air preparation device, some of the aforesaid components can expediently be combined to form one structural unit. For example, an electronic compressed air preparation device 1 according to an embodiment of the present invention is implemented as a structural unit with the components 3, 5, 6, 7, 8a, 9, 12, 16, 17, 18a, 20, 21, 22, 23, 24, 28a. This compressed air preparation device 1 forms one vehicle system 30 together with the compressor 4 and the compressed air containers 8, 18, 28, 38.

In a feed phase (or charging phase), the compressor 4 feeds compressed air to the compressed air containers 8, 18, 28, 38 through the air dryer 6 and the four-circuit protection valve 7.

In a regeneration phase, the control device 3 actuates the regeneration control solenoid valve 24, with the result that the latter switches over and outputs compressed air from the compressed air reservoirs 8, 18, 28, 38 to the regeneration path 21 via the four-circuit protection valve 7 and the feed path 17. Furthermore, the control device 3 switches over the compressor control solenoid valve 23, with the result that the compressor control solenoid valve 23 applies compressed air to the control inlet 4a of the control device 4 and therefore switches off the latter. Furthermore, the venting valve 5 is automatically switched over by the regeneration path 21, which is under pressure, and the venting valve 5 therefore connects the compressor outlet or the inlet of the air dryer 6 to the sound damper 22, with the result that the latter are pressureless. Since the outlet ba of the air dryer 6 is also pressureless, the non-return valve 9 connects through, with the result that when the non-return valve 16 closes, the air dryer 6 is vented in the regeneration direction toward the sound damper 22 and therefore to the surroundings.

As a result, in the feed phase the compressed air that is taken up is dried in the air dryer 6 (and, if appropriate, cleaned), as a result of which the degree of moisture in the air dryer 6 rises. In the regeneration phase, the moisture that is taken up in the air dryer 6 is output again entirely or partially.

The control device 3 can compare current pressure values determined from the pressure signals p1, p2, p3 with a setpoint pressure ps, and when a limiting value is undershot it can, if appropriate, switch over from a regeneration phase to a feed phase. Furthermore, a moisture sensor 12 can be provided, for example, in the air dryer 6 or in a line connected to the air dryer 6, which outputs a measurement signal f of the degree of moisture to the control device 3. However, such a moisture sensor 12 is basically not necessary since the control device 3 can also automatically estimate the moisture content of the air dryer 6, for example from the time period of the previous feed phases and regeneration phases, the engine speed and other vehicle data.

According to embodiments of the invention, the moisture content of the air dryer 6 can be set not only on the basis of the current moisture content, which is determined or estimated, but additionally as a function, first, of the engine load, in particular of the available kinetic energy of the vehicle 2 and/or second, of an anticipated compressed air demand.

In the case of a management process as a function of the engine load, the compressor 4 is driven in time periods or in route sections with a low engine load in order to charge all, or some of, the pressure reservoirs 8, 18, 28, 38 with a higher pressure than a conventional setpoint pressure. Such phases are, in particular, overrun phases Ts of the utility vehicle 2 or of its engine 10 in which the thrust torque applied to the engine 10 via the kinetic energy of the utility vehicle 2 when the engine clutch is engaged is greater than an engine torque requested from the driver or from a vehicle movement dynamics control system. Such overrun phases Ts can be, in particular, downhill travel by the utility vehicle 2 and/or braking processes. Braking of the utility vehicle 2 by means of the engine and the connected compressor 4 is therefore brought about and in a feed phase a relatively high setpoint pressure ps is set at some or all of the pressure reservoirs 8, 18, 28, 38 and therefore charges the latter excessively, but the pressure p remains below an upper safety limiting value. Overrun phases can be respectively determined on an up-to-date basis from a throttle valve position of the engine 10 and/or an accelerator pedal activation and/or a data signal that describes the engine torque on the vehicle bus of the vehicle 2.

The additionally stored compressed air can, on the one hand, be used by means of the consumer circuits connected to the compressed air reservoirs 8, 18, 28, 38. According to embodiments of the invention, this additionally stored compressed air, or a portion thereof, can additionally also be used for excessive drying of the desiccant 6a. In this way, a setpoint moisture value is lowered and in regeneration phases the degree of moisture f is lowered further than in other phases. Although this excessive drying is possibly not expedient in other phases compared to the compressed air flow rate necessary here or the energy corresponding to the compressed air flow rate, since the effectiveness or the further discharging of moisture by means of the introduced compressed air decreases as the degree of moisture decreases, in any case there is an excess of kinetic energy available, and this kinetic energy or a portion of this kinetic energy can therefore be stored in the form of excessive drying of the desiccant of the air dryer 6.

FIG. 2 shows by way of example a schematic view of a route of a vehicle 2 between the start at A and the destination at B. Here, one or more overrun phases Ts are present, for example, on a negative gradient section and before the stationary state of the utility vehicle 2 at the destination B. It is therefore possible to carry out an additional regeneration phase or to prolong a regeneration phase in an overrun phase Ts by means of the control device 3 when an overrun phase has been detected. The connected consumer circuits can basically consume compressed air at any time. For as long as the pressure in the respective compressed air reservoir 8, 18, 28, 38 does not drop considerably as a result of this, any desired switched state of the compressed air preparation device, that is feeding, regeneration or idling, can basically be assumed at the same time as the use.

According to one advantageous embodiment, the relevant time periods or route sections with a low engine load or with overrun conditions can already be determined in advance. For example, this is possible by recording map data K and position data GPS, which are determined by a GPS system of the utility vehicle 2. As a result, the control device 3 and/or a further device, interacting with the control device 3, of the inventive control system can determine predicted overrun phases Ts and implement in them the inventive excessive drying of the desiccant 6a. On the basis of the map data K it is possible, where appropriate, to detect negative gradient sections that do not have excessive negative gradients, a transition from a freeway or expressway to relatively slow roads as well as the end section before the destination B as overrun phases.

As an alternative to or in addition to the determination of the route sections with a low engine load on the basis of map data it is also possible to determine the latter adaptively or in a self-learning fashion when the utility vehicle 2 repeatedly travels over routes or parts of routes. This is advantageous, in particular, in the case of scheduled buses and trucks, for example trucks used in shuttle transportation, which travel regularly along certain ends of routes.

According to embodiments of the invention, it is also possible to determine in advance not only route sections with a different engine load but also route sections with a different compressed air demand. These route sections can, in particular, be downhill journeys with a relatively high negative gradient and Stop-and-Go sections in which there is a relatively high braking demand. Furthermore, it is possible, for example, to estimate the end phase of the route as a time period with an increased compressed air demand, which occurs as a result of braking, decoupling of a semitrailer, coupling of a semitrailer and jackknifing operations in coaches. Furthermore, it is possible to detect when the vehicle is parked with a relatively large stored quantity of compressed air or a relatively high air pressure in some or all of the compressed air reservoirs 8, 18, 28, 38 so that during the subsequent journey this compressed air is available again in order to correspondingly pressurize the consumer circuits and, if appropriate, carry out ride level control processes. In this way, at the end of the journey a maximum pressure is targeted in one, some or all of the compressed air reservoirs 8, 18, 28, 38 and, on the other hand, a very low degree of moisture in the air dryer 6 is sought.

This determination of the route sections with a compressed air demand that is expected to be increased can also be carried out on the basis of the map data K and position data GPS and/or adaptively. In particular, the end of the journey is often input directly into the GPS control system and is therefore known.

According to embodiments of the invention, a self-learning vehicle energy management system can provide profiles of the engine load and/or of the compressed air consumption not only for the same recurring routes but also for routes that are detected as being similar or equivalent. In this context, for example a route profile with corresponding positive gradients and negative gradients and/or a classification as an inner city, country road or freeway are produced, and a consumption profile (power requirement profile) and/or a regeneration profile are assigned to this sequence of the different areas. The inventive energy management system uses this information to optimize the energy flow between the generating elements, i.e., the engine 10 together with the compressor 4, the consumers of the connected consumer circuits and in one, some or all of the compressed air reservoirs 8, 18, 28, 38 and the air dryer 6, which is evaluated as being a device for storing an energy equivalent. The air dryer 6 is therefore also considered to be a type of "energy store" and is functionally integrated since by means of excessive drying an energy equivalent is provided when the energy necessary for this is sufficiently present in the system or present in the system in excess.

Owing to the stored data and the estimation of the consumption profile and/or of the feed profile it is therefore possible to decide how, on the one hand, one, more or all of the compressed air reservoirs 8, 18, 28, 38 are charged or recharged and, on the other hand, the moisture state of the air dryer 6 is set.

The production of the profiles in an adaptive method can be carried out by using minimum values, maximum values and average values from the different journeys. Through recurrent journeys it is possible to respectively improve the profile and adapt it to the changing ambient conditions, for example using sliding average values. It is therefore possible, for example, also to sense traffic jams as a result of temporary road work.

Also, times of day and/or days of the week can be additionally assigned to the route profiles.

Furthermore, for the determination of the route profiles, information relating to the charge state or the mass of the utility vehicle 2, which is partially already available on the vehicle-internal data bus, can be used to better estimate the consumption profile and/or the regeneration profile of the route.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A control device for a vehicle compressed air preparation device, the preparation device including an air dryer having a desiccant, the preparation device being connected to a compressor and at least one compressed air reservoir, the control device being configured to:
   (i) generate output signals for adjusting feed phases and regeneration phases of the compressed air preparation device, wherein in a feed phase the compressor feeds compressed air to the at least one compressed air reservoir via the air dryer, and in a regeneration phase compressed air is conducted from the at least one compressed air reservoir through the air dryer to dry the desiccant; and
   (ii) set the regeneration phases as a function of at least one of a future engine load and a future compressed air consumption value of the vehicle.

2. The control device as claimed in claim 1, wherein the control device is configured to determine a current degree of moisture of the desiccant of the air dryer and to set the degree of moisture by outputting control signals for adjusting the feed phases and regeneration phases to a setpoint degree of moisture.

3. The control device as claimed in claim 2, wherein the control device is configured to determine the current degree of moisture from at least one of (i) a moisture measuring signal of a moisture sensor one of in the air dryer or outside the air dryer and (ii) the air flow rates of preceding feed phases and regeneration phases.

4. The control device as claimed in claim 2, wherein the control device is configured to determine the setpoint degree of moisture at least one of (i) according to a predefined value and (ii) based on at least one of the future engine load and the future compressed air consumption value of the vehicle.

5. A control device for a vehicle compressed air preparation device, the preparation device including an air dryer having a desiccant, the preparation device being connected to a compressor and at least one compressed air reservoir, the control device being configured to:
   (i) generate output signals for adjusting feed phases and regeneration phases of the compressed air preparation device, wherein in a feed phase the compressor feeds compressed air to the at least one compressed air reservoir via the air dryer, and in a regeneration phase compressed air is conducted from the at least one compressed air reservoir through the air dryer to dry the desiccant;

(ii) set the regeneration phases as a function of at least one of a current or future engine load and a current or future compressed air consumption value of the vehicle;

(iii) determine a current degree of moisture of the desiccant of the air dryer and to set the degree of moisture by outputting control signals for adjusting the feed phases and regeneration phases to a setpoint degree of moisture;

(iv) determine the setpoint degree of moisture at least one of according to a predefined value and based on at least one of the current or future engine load and the current compressed air consumption value or a future compressed air consumption value of the vehicle; and (v) set a low setpoint degree of moisture when a low compressed air consumption value is detected and the future compressed air consumption value is determined to be high.

6. The control device as claimed in claim 5, wherein the control device is configured to:

(i) determine the future compressed air consumption value in one of subsequent time periods and route sections, and (ii) when a subsequent time period or route section with a high compressed air consumption value is detected, set (a) initially in at least one overrun phase a higher setpoint pressure in the at least one compressed air reservoir than when no subsequent time period or route section with a high compressed air consumption value is determined, and (b) subsequently at least one additional regeneration phase for effecting the low degree of moisture of the desiccant.

7. The control device as claimed in 6, wherein the control device is configured to:

(i) set the setpoint degree of moisture as a function of at least one of the current and future engine load; and (ii) when one of a current and future overrun phase in which the movement energy of the vehicle drives the engine and the compressor is determined, set a lower setpoint degree of moisture than in other phases.

8. The control device as claimed in claim 7, wherein the control device is configured to:

(i) receive a pressure measurement signal of the current air pressure in one, a plurality of, or all the compressed air reservoirs;

(ii) set the air pressure to a setpoint pressure;

(iii) in an overrun phase, set a higher setpoint pressure than outside an overrun phase; and (iv) in at least one regeneration phase one of before and after charging with high compressed air, set the air dryer to a lower degree of moisture than in other regeneration phases.

9. The control device as claimed in claim 4, wherein the control device is configured to pick up at least one of a throttle valve position of the engine of the vehicle, an accelerator pedal activation and a vehicle-internal data signal that represents engine torque as an input signal for determining the engine load, an overrun phase or a phase with changed throttling of a fuel supply.

10. A control device for a vehicle compressed air preparation device, the preparation device including an air dryer having a desiccant, the preparation device being connected to a compressor and at least one compressed air reservoir, the control device being configured to:

(i) generate output signals for adjusting feed phases and regeneration phases of the compressed air preparation device, wherein in a feed phase the compressor feeds compressed air to the at least one compressed air reservoir via the air dryer, and in a regeneration phase compressed air is conducted from the at least one compressed air reservoir through the air dryer to dry the desiccant, and (ii) set the regeneration phases as a function of at least one of a current or future engine load and a current or future compressed air consumption value of the vehicle; and (iii) set feed phases and regeneration phases at least one of as a function of a determined route-dependent consumption profile of the compressed air and as a function of a determined route-dependent feed profile of the compressed air.

11. The control device as claimed in claim 10, wherein the control device is configured to:

(i) determine current position data;

(ii) compare the position data with at least one of the route-dependent consumption profile and feed profile; and (iii) set the feed phases and regeneration phases as a function of the comparison.

12. The control device as claimed in claim 11, wherein the control device is configured to determine at least one of the route-dependent consumption profile of the compressed air and the route-dependent feed profile of the compressed air from map data.

13. The control device as claimed in claim 11, wherein the control device is configured to determine the consumption profile of a the compressed air and the feed profile of the compressed air adaptively from measured values of previous journeys.

14. A compressed air preparation device, comprising:
a control device as claimed in claim 1;
an air dryer connectable to a compressor, the air dryer including a desiccant; and
at least one valve device for setting feed phases and regeneration phases, wherein the control device is configured to actuate the at least one valve device and switch a feed state of the compressor.

15. A vehicle system, comprising:
a compressed air preparation device as claimed in claim 14;
a compressor driven by a vehicle engine; and
at least one compressed air reservoir.

16. A vehicle, comprising a vehicle system as claimed in claim 15.

17. A method for controlling a compressed air preparation device of a vehicle, the method comprising the steps of:
in a feed phase, feeding compressed air from a compressor via an air dryer into at least one compressed air reservoir to increase the air pressure, and,
in a regeneration phase, outputting compressed air from the compressed air reservoir via the air dryer to dry the air dryer, wherein the regeneration phase is set as a function of at least one of (i) a future engine load, and (ii) a future compressed air consumption value of the vehicle.

18. The control device as claimed in claim 11, wherein the position data is determined from at least one of a global position determining system and from determined route data.

19. The control device as claimed in claim 12, wherein the map data is route-dependent data relating to the gradient and traffic density.

20. A control device for a vehicle compressed air preparation device, the preparation device including an air dryer having a desiccant, the preparation device being connected to a compressor and at least one compressed air reservoir, the control device being configured to:
- (i) generate output signals for adjusting feed phases and regeneration phases of the compressed air preparation device, wherein in a feed phase the compressor feeds compressed air to the at least one compressed air reservoir via the air dryer, and in a regeneration phase compressed air is conducted from the at least one compressed air reservoir through the air dryer to dry the desiccant;
- (ii) set the regeneration phases as a function of at least one of a current or future engine load and a current or future compressed air consumption value of the vehicle;
- (iii) set a setpoint degree of moisture for the feed phases and regeneration phases as a function of at least one of the current and the future engine load; and
- (iv) when one of a current and future overrun phase in which the movement energy of the vehicle drives the engine and the compressor is present, set a lower setpoint degree of moisture than in other phases.

21. The control device as claimed in claim 20, wherein the control device is further configured to:
- (i) receive a pressure measurement signal of the current air pressure in at least one of the compressed air reservoirs;
- (ii) set the air pressure to a setpoint pressure;
- (iii) in an overrun phase, set a higher setpoint pressure than outside an overrun phase; and
- (iv) in at least one regeneration phase one of before and after charging with high compressed air, set the air dryer to a lower degree of moisture than in other regeneration phases.

* * * * *

UNITED STATES PATENT AND TRADEMARK OFFICE
CERTIFICATE OF CORRECTION

PATENT NO. : 8,529,660 B2  Page 1 of 1
APPLICATION NO. : 13/127545
DATED : September 10, 2013
INVENTOR(S) : Diekmeyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this

Fifteenth Day of September, 2015

Michelle K. Lee
*Director of the United States Patent and Trademark Office*